(12) United States Patent
Sartori et al.

(10) Patent No.: US 11,146,940 B2
(45) Date of Patent: *Oct. 12, 2021

(54) OPERATING STATES FOR D2D DISCOVERY

(71) Applicant: Futurewei Technologies, Inc., Plano, TX (US)

(72) Inventors: Philippe Sartori, Plainfield, IL (US); Hossein Bagheri, Urbana, IL (US); Vipul Desai, Palatine, IL (US); Anthony C. K. Soong, Plano, TX (US); Mazin Ali Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/354,574

(22) Filed: Mar. 15, 2019

(65) Prior Publication Data

US 2019/0215678 A1 Jul. 11, 2019

Related U.S. Application Data

(63) Continuation of application No. 15/464,994, filed on Mar. 21, 2017, now Pat. No. 10,257,688, which is a
(Continued)

(51) Int. Cl.
*H04W 8/00* (2009.01)
*H04W 76/14* (2018.01)
(Continued)

(52) U.S. Cl.
CPC ........... *H04W 8/005* (2013.01); *H04W 60/00* (2013.01); *H04W 76/11* (2018.02); *H04W 76/14* (2018.02); *H04W 76/27* (2018.02); *H04W 92/18* (2013.01)

(58) Field of Classification Search
CPC ..... H04W 8/005; H04W 76/14; H04W 76/11; H04W 76/27; H04W 60/00; H04W 92/18
(Continued)

(56) References Cited

U.S. PATENT DOCUMENTS 8,233,495 B2 * 7/2012 Qi .................... H04W 76/14
370/431
2008/0108346 A1 5/2008 Umatt et al.
(Continued)

OTHER PUBLICATIONS

3rd Generation Partnership Project; Technical Specification Group Services and System Aspects; Feasibility study for Proximity Services (ProSe) (Release 12), 3GPP TR 22.803 v12.0.0, Dec. 2012, 40 pages.
(Continued)

*Primary Examiner* — Farid Seyedvosoghi
(74) *Attorney, Agent, or Firm* — Slater Matsil, LLP

(57) ABSTRACT

A device is configured to perform a method of device-to-device (D2D) communication in a wireless communication network in accordance with a Long Term Evolution (LTE) standard. The method includes entering an RRC-Idle state or an RRC-Connected state. The method also includes transmitting, in the RRC-Idle state or RRC-Connected state, a D2D discovery signal for receipt by at least one second device in the network. The method further includes receiving, in the RRC-Idle state or RRC-Connected state, at least one D2D discovery signal from the at least one second device in the network.

18 Claims, 5 Drawing Sheets

- RRC-IDLE:
    - PLMN selection;
    - DRX configured by NAS;
    - Broadcast of system information;
    - Paging;
    - Cell re-selection mobility;
    - The UE shall have been allocated an id which uniquely identifies the UE in a tracking area;
    - No RRC context stored in the eNB
    - *The UE shall have been allocated a D2D ID*
    - *Transmission and monitoring of discovery signals*

600

Related U.S. Application Data continuation of application No. 14/508,795, filed on Oct. 7, 2014, now Pat. No. 9,602,997.

(60) Provisional application No. 61/888,410, filed on Oct. 8, 2013.

(51) Int. Cl.
*H04W 76/27* (2018.01)
*H04W 76/11* (2018.01)
*H04W 60/00* (2009.01)
*H04W 92/18* (2009.01)

(58) Field of Classification Search
USPC ...... 370/328, 280, 329, 330; 455/434, 556.1
See application file for complete search history.

(56) References Cited

U.S. PATENT DOCUMENTS

| | | | |
|---|---|---|---|
| 2012/0011247 A1 | 1/2012 | Mallik et al. | |
| 2013/0109301 A1 | 5/2013 | Hakola et al. | |
| 2014/0334456 A1* | 11/2014 | Mukherjee | H04W 4/90 370/336 |
| 2014/0349694 A1 | 11/2014 | Raghothaman et al. | |
| 2015/0071189 A1* | 3/2015 | Park | H04W 8/005 370/329 |
| 2015/0085791 A1* | 3/2015 | Baghel | H04W 72/005 370/329 |
| 2015/0156165 A1* | 6/2015 | Lindoff | H04W 8/005 370/329 |
| 2015/0312821 A1* | 10/2015 | Yamazaki | H04W 72/1284 370/338 |

OTHER PUBLICATIONS

3rd Generation Partnership Project; Technical Specification Group Ran; Study on LTE Device to Device Proximity services; (Release 12), 3GPP TR 36.843, V0.1.0, Apr. 2013, 8 pages.
3rd Generation Partnership Project; Technical Specification Group Radio Access Network; Evolved Universal Terrestrial Radio Access (E-UTRA); Physical layer procedures (Release 11), 3GPP TS 36.213, V11.4.0, Sep. 2013, 182 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.7.0, Sep. 2013, 209 pages.
3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331, V11.5.0, Sep. 2013, 347 pages.
3rd Generation Partnership Project; Technical Specification Group Radio Access Network; Evolved Universal Terrestrial Radio Access (E-UTRA); User Equipment (UE) procedures in idle mode (Release 11), 3GTPP TS 36.304, V11.5.0, Sep. 2013, 34 pages.
Huawei, et al., "Benefits of type-2 discovery," 3GPP TSG RAN WG1 Meeting #74bis, R1-134076, Guangzhou, China, Dctober 7-11, 2013, 3 pp.
Huawei, et al., "Comparison of Type 1, Type 2a and Type 2b Discovery Resource Allocation," 3GPP TSG RAN WG2 Meeting #83bis, R2-133278, Ljubljana, Slovenia, Oct. 7-11, 2013, 7 pages.
Huawei, et al. "D2D discovery message size," 3GPP TSG RAN WG1 Meeting #74bis, R1-134075, Guangzhou, China, Oct. 7-11, 2013, 3 pages.
Huawei, et al., "PHY considerations for discovery signal design," 3GPP TSG RAN WG1 Meeting #73, R1-132413, Fukuoka, Japan, May 20-24, 2013, 6 pages.
Huawei, et al., "Physical layer options for D2D discovery," 3GPP TSG RAN WG1 Meeting #73, R1-131864, Fukuoka, Japan, May 20-24, 2013, 8 pages.
Huawei, et al., "System-lovel performance of D2D discovery," 3GPP TSG RAN WG1 Meeting #74bis, R1-134074, 'Guangzhou, China, Oct. 7-11, 2013, 9 pages.
Meylan, "LTE Radio Layer 2, RRC and Radio Access Network Architecture," REV-090004, 3GPP a Global Initiative, Huawei, 3GPP TSG-RAN WG2, (ftp://www.3gpp.org/Information/presentations)presentations_2010/2010_06_India/3GPP LTE Radio layer 2.pdf), 2010, 44 pages.
Qualcomm Inc., "D2D Discovery," 3GPP TSG-RAN WG2 #83 Bis, R2-133482, Ljubljana, Slovenia, Oct. 7-11, 2013, 8 pages.
Qualcomm Inc., Cover sheet for Draft TR 36.843 "Study on LTE Device to Device Proximity Services," 3GPP TSG-RAN WG1 #72bis, R1-131717, Chicago, IL, Apr. 15-19, 2013, 1 pages.
MCC Support, "Final Report of 3GPP TSG RAN WG1 #73 v1.0.0," 3GPP TSG RAN WG1 Meeting #74, R1-133803, Barcelona, Spain, Aug. 19-23, 2013, 107 pages.
Nokia Corp., "Discussion on idle mode UE discovery," 3GPP TSG-RAN WG2 Meeting #83bis, R2-133382, Ljubljana, Slovenia, Oct. 7-11, 2013, 3 pages.

* cited by examiner

- RRC-IDLE:
  - PLMN selection;
  - DRX configured by NAS;
  - Broadcast of system information;
  - Paging;
  - Cell re-selection mobility;
  - The UE shall have been allocated an id which uniquely identifies the UE in a tracking area;
  - No RRC context stored in the eNB
  - *The UE shall have been allocated a D2D ID*
  - *Transmission and monitoring of discovery signals* } 600

FIG. 6

- RRC-CONNECTED:
  - UE has an E-UTRAN-RRC connection;
  - UE has context in E-UTRAN;
  - E-UTRAN knows the cell which the UE belongs to;
  - Network can transmit and/or receive data to/from UE;
  - Network controlled mobility (handover and inter-RAT cell change order to GERAN with NACC);
  - Neighbor cell measurements;
  - At PDCP/RLC/MAC level;
    - UE can transmit and/or receive data to/from network;
    - UE monitors control signaling channel for shared data channel to see if any transmission over the shared data channel has been allocated to the UE;
    - UE also reports channel quality information and feedback information to eNB;
    - DRX period can be configured according to UE activity level for UE power saving and efficient resource utilization. This is under control of the eNB.
  - *Transmission and monitoring of discovering signals* ← 700

FIG. 7

OPERATING STATES FOR D2D DISCOVERY

CROSS-REFERENCE TO RELATED APPLICATIONS

This application is a continuation of U.S. patent application Ser. No. 15/464,994, filed on Mar. 21, 2017, which is a continuation of U.S. patent application Ser. No. 14/508,795, filed on Oct. 7, 2014, (now U.S. Pat. No. 9,602,997, issued Mar. 21, 2017) which claims the benefit of U.S. Provisional Application No. 61/888,410, filed on Oct. 8, 2013, which applications are hereby incorporated herein by reference.

TECHNICAL FIELD

The present disclosure relates generally to digital communications, and more particularly, to a system and method for transmission and reception of device-to-device signals in a communications system.

BACKGROUND

Systems that operate using device-to-device (D2D) standards have the potential to provide new services, improve system throughput, and offer a better user experience. The application of D2D technology is under investigation in 3GPP (3rd Generation Partnership Project). Potential use cases for D2D have been identified by 3GPP participants. Some uses cases considered for the LTE (Long Term Evolution) standard are associated with a variety of devices, including user equipment (UE), cell phones, smart phones, and network equipment, e.g., communications controller, base stations, enhanced nodeB (eNB), and the like.

SUMMARY

According to one embodiment, there is provided a method of device-to-device (D2D) communication in a wireless communication network in accordance with a Long Term Evolution (LTE) standard. The method includes entering, by a first device, an RRC-Idle state or an RRC-Connected state; transmitting, by the first device in the RRC-Idle state or RRC-Connected state, a D2D discovery signal for receipt by at least one second device in the network; and receiving, by the first device in the RRC-Idle state or RRC-Connected state, at least one D2D discovery signal from the at least one second device in the network.

According to another embodiment, there is provided a device capable of D2D communication in a wireless communication network in accordance with a LTE standard. The device includes at least one antenna configured to transmit and receive signals. The device also includes at least one processor configured to control the device to enter an RRC-Idle state or an RRC-Connected state; transmit, while in the RRC-Idle state or RRC-Connected state, a D2D discovery signal for receipt by at least one second device in the network; and receive, while in the RRC-Idle state or RRC-Connected state, at least one D2D discovery signal from the at least one second device in the network.

According to yet another embodiment, there is provided a system for D2D communication in a wireless communication network in accordance with a LTE standard. The system includes a first D2D device and a second D2D device. The first D2D device is configured to enter an RRC-Idle state or an RRC-Connected state; transmit, while in the RRC-Idle state or RRC-Connected state, a D2D discovery signal for receipt by the second device; and receive, while in the RRC-Idle state or RRC-Connected state, at least one D2D discovery signals from the second device.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 illustrates a modified RRC-Idle state in accordance with this disclosure;

FIG. 7 illustrates a modified RRC-Connected state in accordance with this disclosure;

DETAILED DESCRIPTION OF ILLUSTRATIVE EMBODIMENTS

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The following documents and standards descriptions are hereby incorporated into this disclosure as if fully set forth herein:

3GPP TR 22.803, version 12.0.0, December 2012 (hereinafter "REF1"); R1-133803, "Final Report of 3GPP TSG RAN WG1 #73 v1.0.0", Fukuoka, Japan, May 20-24, 2013, MCC Support (hereinafter "REF2"); 3GPP TR 36.300, version 11.3.0, September 2012 (hereinafter "REF3"); Arnaud Meylan, "LTE Radio Layer 2, RRC and Radio Access Network Architecture", 3GPP TSG-RAN WG2 (hereinafter "REF4"); 3GPP TR 36.304, version 11.5.0, September 2013 (hereinafter "REF5").

Figure 1:
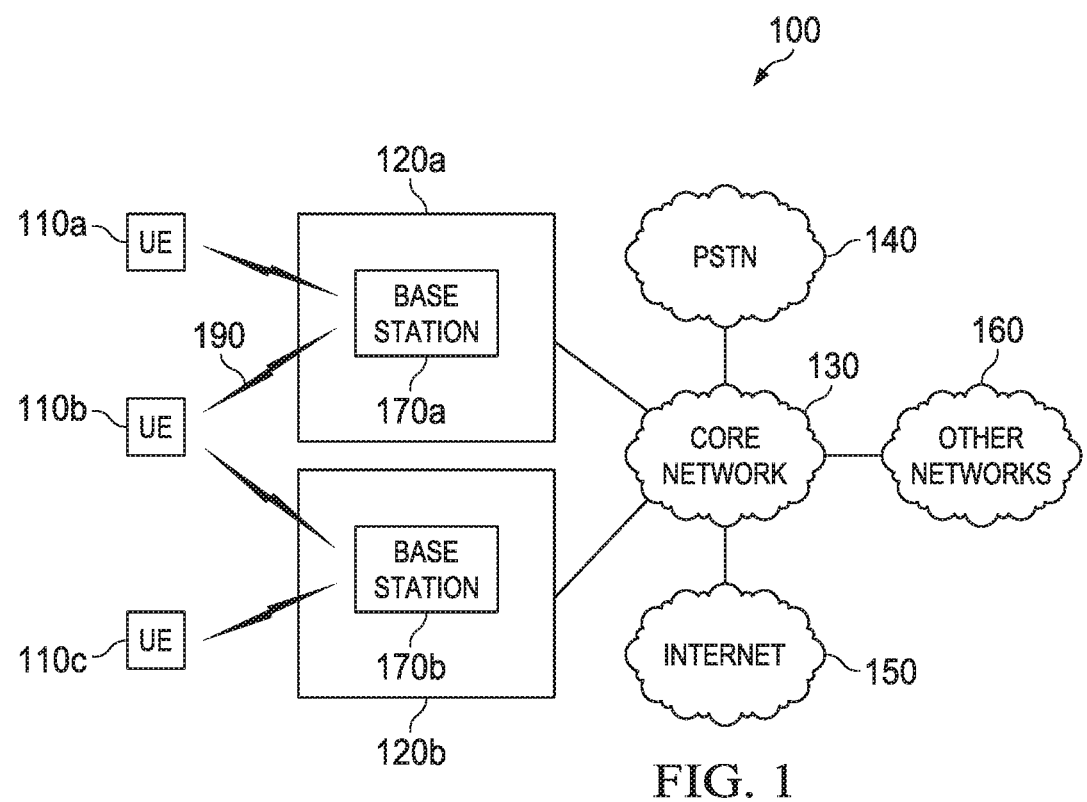
FIG. 1 illustrates an example communication system that may be used for implementing the devices and methods disclosed herein.

FIG. 1 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), a wireless router, a server, a switch, or any other suitable processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described herein. In particular embodiments, the base stations 170a-170b and UEs 110a-110c are configured to implement LTE, LTE-A, and/or LTE-B. Additionally, in accordance with this disclosure, one or more of the base stations 170a-170b and UEs 110a-110c are configured to communicate according to device-to-device (D2D) communication and discovery standards and principles. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

Figure 2A:
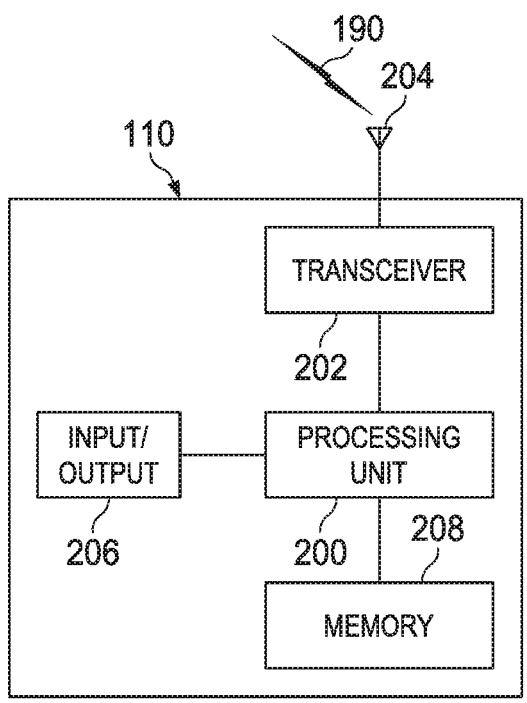
FIGS. 2A and 2B illustrate example devices that may be used for implementing the methods and teachings disclosed herein.
Figure 2B:
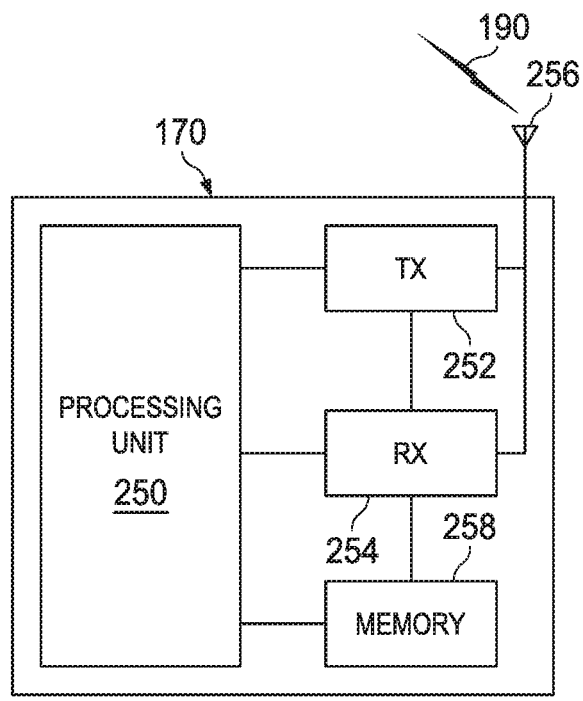

FIGS. 2A and 2B illustrate example devices that may be used for implementing the methods and teachings disclosed herein. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. For example, the processing unit 200 is configured to control or support operations of the UE 110 according to the D2D standards and principles described below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. For example, the processing unit 250 is configured to control or support operations of the base station 170 according to the D2D standards and principles described below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

In Version 11 of the LTE standard, a UE can have two radio resource control (RRC) states: RRC-Idle and RRC-Connected. These states were developed for communications between a communication controller (e.g., an eNB) and a UE. With the introduction of D2D discovery and D2D communication, these two states may not be adequate for a UE operating with D2D functionality, especially when considering the various deployments and functions.

Figure 3:
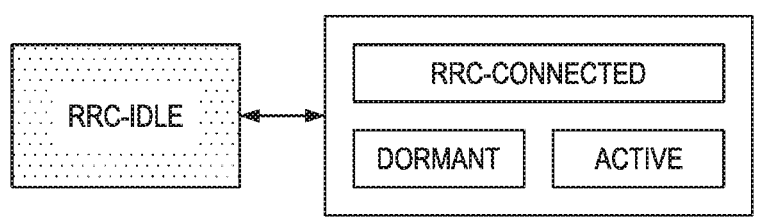
FIG. 3 depicts a state diagram illustrating radio resource control (RRC) states in a LTE Version 11 system.

To illustrate, FIG. 3 depicts a state diagram of the RRC states in a LTE Version 11 system. As shown in FIG. 3, the states are RRC-Idle and RRC-Connected. FIG. 3 also shows that the RRC-Connected state has two sub-states: Dormant and Active. For the sake of brevity, the "RRC-Idle state" is also sometimes referred to herein as the "idle state". Likewise, the "RRC-Connected state" is also sometimes referred to herein as the "connected state".

For D2D, two functions are envisioned: Communication and Discovery. These functions are now defined.

Communication: When performing a Communication function, a UE directly communicates with other UEs without the communication data passing through the eNB. A UE in D2D communication with another device is not precluded from performing cellular communication (i.e., exchanging data with another entity through the communications controller).

Discovery: When performing discovery, a UE both can discover and is discoverable. That is, a UE can attempt to discover neighboring UEs by receiving discovery signals, and can transmit discovery signals for other UEs to discover it.

In some environments, a UE may be in-coverage (IC) or out-of-coverage (OOC). When the UE is IC (i.e., in-network coverage), the UE can establish a link with an eNB. When the UE is OOC (i.e., out-of-network coverage), the UE cannot establish a link with an eNB. Typically, if a UE can receive synchronization signals, such as the primary synchronization signal (PSS), secondary synchronization signal (SSS), master information block (MIB), and system information block (SIB), the UE can be considered in-coverage (IC). Conversely, if the UE cannot receive such information, it is out-of-coverage (OOC).

Figure 4:
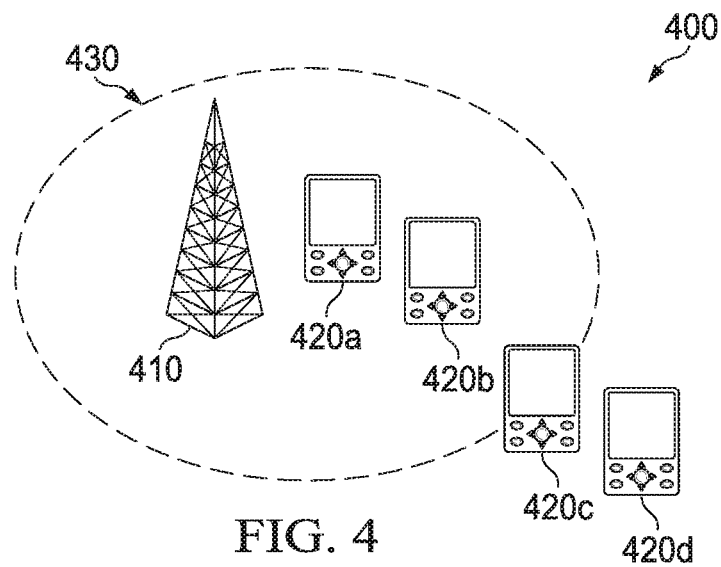
FIG. 4 illustrates examples of different coverage scenarios in a wireless communication system.

To illustrate, FIG. 4 depicts examples of different coverage scenarios in a wireless communication system. As shown in FIG. 4, the system 400 includes an eNB 410 and a plurality of devices represented by UEs 420a-420d. In certain embodiments, the eNB 410 may represent one or more of the base stations 170a-170b of FIG. 1, and the UEs 420a-420d may represent one or more of the UEs 110a-110c of FIG. 1. The eNB 410 controls communications within a coverage area 430. In the system 400, the UEs 420a-420b are in-network coverage, while the UE 420d may be considered out-of-network coverage. The UE 420c may be in partial network coverage due to its proximity to the coverage area 430 of the eNB 410.

During LTE standardization discussions, D2D discovery was categorized by two types, as indicated by the following text from REF2:

"At least the following two types of discovery procedure are defined for the purpose of terminology definition for use in further discussions/studies (note that these definitions are intended only to aid clarity and not to limit the scope of the study):

Type 1: a discovery procedure where resources for discovery signal transmission are allocated on a non UE specific basis Note: Resources can be for all UEs or group of UEs Type 2: a discovery procedure where resources for discovery signal transmission are allocated on a per UE specific basis Type 2A: Resources are allocated for each specific transmission instance of discovery signals Type 2B: Resources are semi-persistently allocated for discovery signal transmission."

Based on the current LTE definitions, UEs are either in RRC-Connected or RRC-Idle state with respect to a network. When a UE operates in the RRC-Idle state, the only signal the UE can transmit is the physical random access channel (PRACH). For all other transmissions, the UE enters the RRC-Connected state. Thus, under LTE Version 12, it is envisioned that devices participating in communication with each other are operating in the RRC-Connected state. However, for D2D discovery signal transmission, operating in RRC-Connected state may not be feasible due to the overhead associated with establishing an RRC connection. Furthermore, OOC devices (i.e., devices that are out-of-network coverage) cannot enter the RRC connected state since there is no network to connect to.

The functionalities of the RRC-Idle and RRC-Connected states described in REF5 are shown below:

RRC-Idle:
PLMN selection;
DRX configured by NAS;
Broadcast of system information;
Paging;
Cell re-selection mobility;
The UE shall have been allocated an id which uniquely identifies the UE in a tracking area;
No RRC context stored in the eNB.

RRC-Connected:
UE has an E-UTRAN-RRC connection;
UE has context in E-UTRAN;
E-UTRAN knows the cell which the UE belongs to;
Network can transmit and/or receive data to/from UE;
Network controlled mobility (handover and inter-RAT cell change order to GERAN with NACC);
Neighbor cell measurements;
At PDCP/RLC/MAC level:
UE can transmit and/or receive data to/from network;
UE monitors control signaling channel for shared data channel to see if any transmission over the shared data channel has been allocated to the UE;

UE also reports channel quality information and feedback information to eNB;

DRX period can be configured according to UE activity level for UE power saving and efficient resource utilization. This is under control of the eNB.

Figure 5:
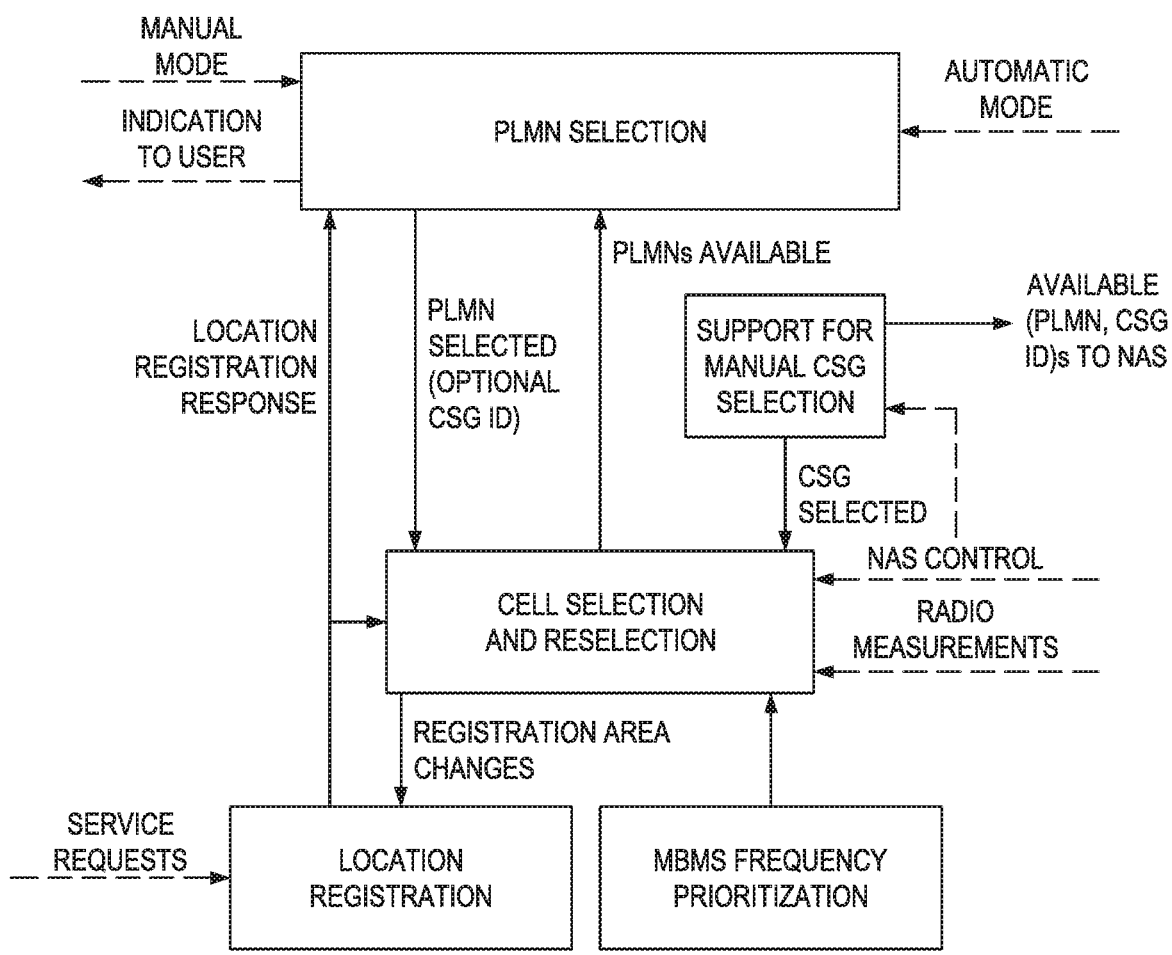
FIG. 5 illustrates available operations in a RRC-Idle state.

FIG. 5 illustrates available operations in the RRC-Idle state, as described in REF5.

For D2D communication, not all functions available in the RRC-Connected state may be needed, especially for out-of-network coverage. However, there is a need for a UE to communicate using D2D functionality while outside network coverage and to use limited resources while in network coverage.

With the introduction of D2D, the current mapping of the idle state and connected state can be insufficient. The requirement that devices be in the connected state for the transmission of discovery signals can increase system overhead (e.g., increased messaging between the device and the communications controller) and can consume system resources (e.g., memory, ports). In addition, a device may be subject to increased power consumption due to the requirements of the connected state. Furthermore, the notion of the connected state is not applicable to devices out-of-network coverage.

To address the limitations of the current two states, RRC-Idle and RRC-Connected, embodiments of this disclosure provide a new state, D2D-Connected state, configured to support D2D communications and D2D discovery. In other embodiments of this disclosure, the existing states, RRC-Idle and RRC-Connected, are modified to support D2D discovery and D2D communication. It will be understood that combinations of two or more of the disclosed embodiments can be used for D2D.

In an embodiment, the available functionalities of the RRC-Idle state are modified so that a UE can transmit D2D discovery signals. FIG. 6 illustrates the modified RRC-Idle state according to this embodiment. As shown in FIG. 6, the available functionalities of the modified RRC-Idle state include two new features, indicated at reference number 600:

"The UE shall have been allocated a D2D ID"; and
"Transmission and monitoring of discovery signals".

In accordance with the modified RRC-Idle state, a UE is allocated a D2D identifier (D2D ID). The D2D ID can be a network assigned value; for example, the D2D ID can be provided to the UE during a registration process. However, it will be understood that the D2D ID can be allocated to the UE in any other suitable manner. The modified RRC-Idle state and the associated D2D ID enables the UE to perform D2D discovery while in the RRC-Idle state.

In another embodiment, the available functionalities of the RRC-Connected state are modified so that a UE can perform discovery. FIG. 7 illustrates the modified RRC-Connected state according to this embodiment. As shown in FIG. 7, the available functionalities of the modified RRC-Connected state include one new feature, indicated at reference number 700;

"Transmission and monitoring of discovery signals".

In accordance with the modified RRC-Connected state, the UE is able to perform D2D discovery while engaging in cellular communications (i.e., transmissions between the UE and a communications controller, such as an eNB) or engaging in D2D communications. A D2D ID can be assigned to the UE in the RRC-Connected state.

In another embodiment, a new state, "D2D-Connected", is introduced. In the D2D-Connected state, the UE can transmit D2D signals without being in the RRC-Connected state. As in the modified RRC-Idle and RRC-Connected states, a UE in the D2D-Connected can be assigned a D2D ID. A list of possible actions and functionalities associated with the D2D-Connected state is provided below. In some embodiments, the D2D-Connected state can be a subset of the RRC-Idle state, the RRC-Connected state, or both.

D2D-Connected:

The UE shall have been allocated a D2D ID;
Monitoring of discovery configuration SIB (for Type 1 discovery) OR the UE has previously received a discovery resource allocation and parameters (for Type 2 discovery);
Coarse synchronization with the master UE or eNB;
Transmission and monitoring of discovery signals per the resources allocated for discovery and the discovery parameters.

Figure 8:
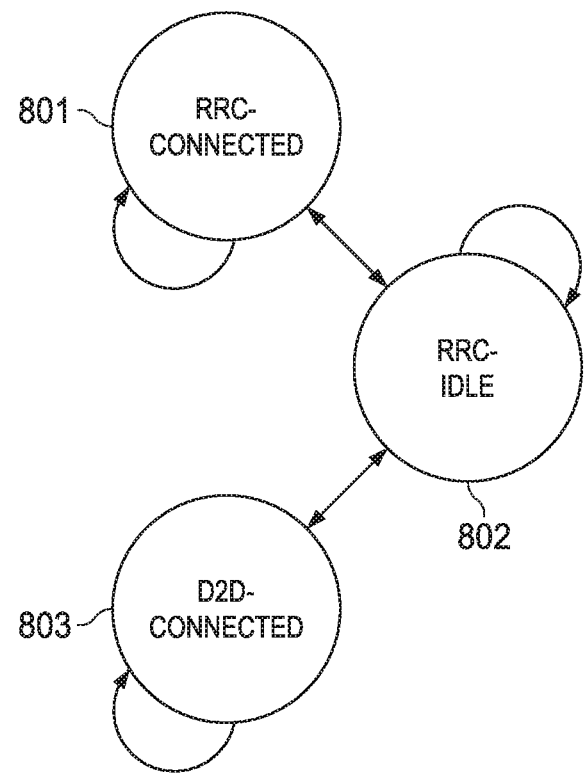
FIG. 8 depicts a state diagram illustrating different states of operation for a UE in accordance with this disclosure.

FIG. 8 depicts a state diagram illustrating the different states of operation for a UE in accordance with this disclosure. As shown in FIG. 8, the UE may operate in any of RRC-Connected state 801, the RRC-Idle state 802, or the D2D-Connected state 803. As indicated by the arrows, a UE operating in the RRC-Idle state 802 can transition directly to either the RRC-Connected state 801 or the D2D-Connected state 803. A UE operating in the RRC-Connected state 801 can transition directly to the RRC-Idle state 802; to transition from the RRC-Connected state 801 to the D2D-Connected state 803, the UE first transitions to the RRC-Idle state 802, and then to the D2D-Connected state 803. Similarly, a UE operating in the D2D-Connected state 803 can transition directly to the RRC-Idle state 802; to transition from the D2D-Connected state 803 to the RRC-Connected state 801, the UE first transitions to the RRC-Idle state 802, and then to the RRC-Connected state 801.

In another embodiment, the operation of the RRC-Idle state and the D2D-Connected state are combined. For example, in a typical, non-D2D environment, when a UE operates in the RRC-Idle state, the UE can receive broadcast information, such as discovery resource allocation, from its master controller (e.g., an eNB for in-coverage or a master UE for out-of-coverage deployments). The UE also obtains coarse time-frequency synchronization. In contrast, in a D2D system, a UE in the RRC-Idle state can enter a D2D-Connected state during discovery instances. In the D2D-Connected state, the UE can transmit or receive discovery signals on discovery resources. Afterwards, the UE can return to the RRC-Idle state.

Figure 9:
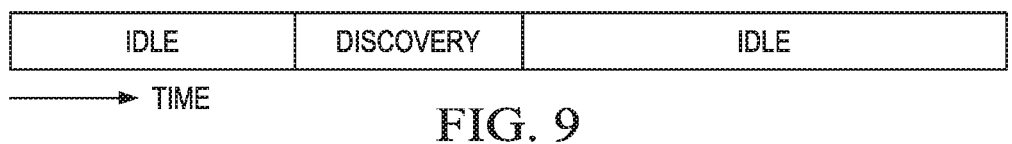
FIGS. 9 and 10 illustrate examples of transitions between states as a function of time for a time division duplex (TDD) configuration, in accordance with this disclosure.

FIG. 9 illustrates an example of this transition between states as a function of time for a time division duplex (TDD) configuration, in accordance with this disclosure. As shown in FIG. 9, a UE in an idle state (e.g., RRC-Idle state) can transition to a discovery state (e.g., D2D-Connected state) in order to transmit or receive discovery signals on discovery resources, then transition back to the idle state.

In some embodiments, there may be some restrictions on operations. In one example, during the D2D-Connected state, only discovery is performed, and none of the functionalities of the RRC-Idle state (e.g., cell reselection, reception of paging signal) is repeated. If discovery is performed on uplink resources (e.g., resources for transmission of signals from the UE to a communications controller), such restrictions on downlink (e.g., transmissions from a communications controller) may not be needed. For example, in a frequency division duplex (FDD) configuration, the UE downlink can be in the RRC-Idle state while the UE uplink is in the D2D-Connected state.

Figure 10:
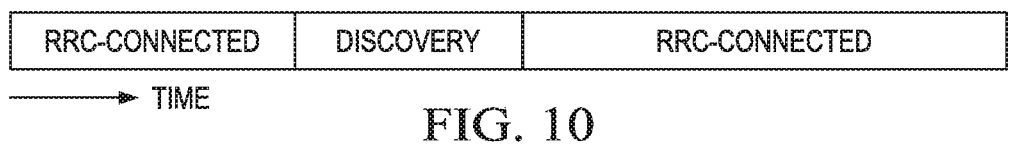

In another embodiment, a UE can perform discovery transmission/reception on discovery resources while operating in the RRC-connected state. That is, a UE in the RRC-Connected state can enter a D2D-Connected state to transmit or receive discovery signals on discovery resources, then return to the RRC-Connected state. FIG. 10 illustrates an example description of this transition between states for a TDD configuration. As shown in FIG. 10, a UE in a RRC-Connected state can transition to a discovery state (e.g., D2D-Connected state) to perform discovery, then transition back to the RRC-Connected state.

In some embodiments, such as the embodiments shown in FIGS. 9 and 10, the transition between states can occur on time boundaries, such as the start of a subframe. For example, in LTE, a subframe represents 1 msec, and a frame, which consists of 10 subframes, is 10 msec. Each subframe includes 2 slots, each 0.5 msec in duration. In systems with a normal cyclic prefix, there can be 7 symbols per slot. In a D2D system, the transition between states can occur at the start of a subframe, a frame, a slot, or a symbol.

In some embodiments, in the event that the UE leaves the RRC-Connected state (e.g., due to a lost connection), the UE should enter the RRC-Idle state first, even if the current subframe is designated as a discovery subframe.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of device-to-device (D2D) communication in a wireless communication network in accordance with a Long Term Evolution (LTE) standard, the method comprising:

receiving, by a first device from the network via a base station in association with a registration process, an assignment of a D2D identifier for identification of the first device during D2D communication both when the first device is in-coverage of the base station and when the first device is out-of-coverage of the base station;

entering, by the first device, a radio resource control-idle (RRC-Idle) state or a radio resource control-connected (RRC-Connected) state;

transmitting, by the first device while operating in the RRC-Idle state or the RRC-Connected state, a D2D discovery signal for receipt by one or more second devices in the network;

receiving, by the first device while operating in the RRC-Idle state or the RRC-Connected state, at least one D2D discovery signal from at least one of the one or more second devices in the network; and transmitting, by the first device, a D2D signal that includes the D2D identifier to the one or more second devices in the network, wherein the device transitions between states at an occurrence of a frame boundary or a subframe boundary.

2. The method of claim 1, wherein transmitting the D2D discovery signal comprises transitioning to a D2D-Connected state to transmit the D2D discovery signal, then transitioning back to the RRC-Idle or the RRC-Connected state after transmitting the D2D discovery signal.

3. The method of claim 1, further comprising entering, by the first device, a D2D-Connected state prior to transmitting the D2D signal to the one or more second devices in the network.

4. The method of claim 1, wherein entering the RRC-Idle state or the RRC-Connected state comprises entering the RRC-Connected state, and wherein transmitting the D2D discovery signal comprises transmitting, by the first device, the D2D discovery signal while in the RRC-Connected state and while engaged in cellular communication with the base station.

5. The method of claim 1, wherein the transmitting the D2D discovery signal comprises transmitting the D2D discovery signal on resources allocated for discovery.

6. The method of claim 1, wherein the receiving the at least one D2D discovery signal comprises receiving the at least one D2D discovery signal on resources allocated for discovery.

7. The method of claim 1, further comprising receiving, by the first device from the network, a configuration indicating resources allocated for discovery.

8. A device capable of device-to-device (D2D) communication in a wireless communication network in accordance with a Long Term Evolution (LTE) standard, the device comprising:

at least one antenna configured to transmit and receive signals; and at least one processor configured to control the device to:

receive, from the network via a base station in association with a registration process, an assignment of a D2D identifier for identification of the device during D2D communication both when the device is in-coverage of the base station and when the device is out-of-coverage of the base station;

enter a radio resource control-idle (RRC-Idle) state or a radio resource control-connected (RRC-Connected) state;

transmit, while operating in the RRC-Idle state or the RRC-Connected state, a D2D discovery signal, in accordance with the D2D identifier for identification of the device, for receipt by one or more second devices in the network;

receive, in the RRC-Idle state or the RRC-Connected state, at least one D2D discovery signal from at least one of the one or more second devices in the network; and transmit a D2D signal that includes the D2D identifier to the one or more second devices in the network, wherein the device transitions between states at an occurrence of a frame boundary or a subframe boundary.

9. The device of claim 8, wherein the at least one processor is configured to control the device to transmit the D2D discovery signal by transitioning to a D2D-Connected state to transmit the D2D discovery signal, then transitioning back to the RRC-Idle or the RRC-Connected state after transmitting the D2D discovery signal.

10. The device of claim 8, wherein the at least one processor is configured to control the device to enter a D2D-Connected state prior to transmitting the D2D signal to the one or more second devices in the network.

11. The device of claim 8, wherein the at least one processor configured to control the device to enter the RRC-Idle state or the RRC-Connected state comprises the at least one processor configured to control the device to enter the RRC-Connected state, and wherein the at least one processor configured to control the device to transmit the D2D discovery signal comprises the at least one processor configured to control the device to transmit the D2D discovery signal while in the RRC-Connected state and while engaged in cellular communication with the base station.

12. The device of claim 8, wherein the at least one processor is configured to control the device to transmit the D2D discovery signal on resources allocated for discovery.

13. The device of claim 8, wherein the at least one processor is configured to control the device to receive the at least one D2D discovery signal on resources allocated for discovery.

14. The device of claim 8, wherein the at least one processor is configured to control the device to receive, from the network, a configuration indicating resources allocated for discovery.

15. A system for device-to-device (D2D) communication in a wireless communication network in accordance with a Long Term Evolution (LTE) standard, the system comprising:
    a first D2D device; and
    one or more second D2D devices,
    wherein the first D2D device is configured to:
        receive, from the network via a base station in association with a registration process, an assignment of a D2D identifier for identification of the first D2D device during D2D communication both when the first D2D device is in-coverage of the base station and when the first D2D device is out-of-coverage of the base station;
        enter a radio resource control-idle (RRC-Idle) state or a radio resource control-connected (RRC-Connected) state;
        transmit, while operating in the RRC-Idle state or the RRC-Connected state, a D2D discovery signal, in accordance with the D2D identifier for identification of the first device, for receipt by the one or more second D2D devices;
        receive, while operating in the RRC-Idle state or the RRC-Connected state, at least one D2D discovery signal from the at least one of the one or more second D2D devices; and
        transmit a D2D signal that includes the D2D identifier to the one or more second devices in the network, wherein the first D2D device transitions between states at an occurrence of a frame boundary or a subframe boundary.

16. The system of claim 15, wherein the first D2D device is configured to transmit the D2D discovery signal by transitioning to a D2D-Connected state to transmit the D2D discovery signal, then transitioning back to the RRC-Idle or the RRC-Connected state after transmitting the D2D discovery signal.

17. The system of claim 15, wherein the first D2D device is configured to enter a D2D-Connected state prior to transmitting the D2D signal to the one or more second devices in the network.

18. The system of claim 15, wherein the first D2D device configured to enter the RRC-Idle state or the RRC-Connected state comprises the first D2D device configured to enter the RRC-Connected state, and wherein the first D2D device configured to transmit the D2D discovery signal comprises the first D2D device configured to transmit the D2D discovery signal while in the RRC-Connected state and while engaged in cellular communication with the base station.

* * * * *